(12) United States Patent
Murray

(10) Patent No.: US 6,434,237 B1
(45) Date of Patent: Aug. 13, 2002

(54) ELECTRONIC DEVICE SUPPORT CONTAINING RHEOLOGICAL MATERIAL WITH CONTROLLABLE VISCOSITY

(75) Inventor: Matthew Justin Murray, Lund (SE)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/481,310

(22) Filed: Jan. 11, 2000

(51) Int. Cl.⁷ .............................. H04M 1/00
(52) U.S. Cl. ...................... 379/446; 379/454
(58) Field of Search .................. 379/446, 455, 379/454, 442, 462, 420; 455/569

(56) References Cited

U.S. PATENT DOCUMENTS

| | | | |
|---|---|---|---|
| 4,923,057 A | 5/1990 | Carlson et al. | 188/378 |
| 4,992,190 A | 2/1991 | Shtarkman | 252/62.52 |
| 5,075,023 A | 12/1991 | Fukuyama et al. | 252/74 |
| 5,087,382 A | 2/1992 | Ishino et al. | 252/73 |
| 5,139,691 A | 8/1992 | Bloink et al. | 252/74 |
| 5,167,850 A | 12/1992 | Shtarkman | 252/62.52 |
| 5,257,681 A | 11/1993 | Shtarkman et al. | 188/267 |
| 5,277,281 A | 1/1994 | Carlson et al. | 188/267 |
| 5,284,330 A | 2/1994 | Carlson et al. | 267/140.14 |
| 6,058,184 A | * 5/2000 | Frank | 379/420 |

* cited by examiner

Primary Examiner—Jack Chiang
Assistant Examiner—Karen Le
(74) Attorney, Agent, or Firm—Myers Bigel Sibley & Sajovec

(57) ABSTRACT

Flexible supports for enhancing hands-free operation of telecommunications devices such as radiotelephones are provided. An elongate member containing Theological material is flexible in the absence of an electromagnetic energy field and becomes rigid in the presence of an electromagnetic energy field. When electrical current flow is induced through one or more internal electrical conductors, the Theological material viscosity increases from that of a fluid to that of a solid. Accordingly, in the absence of electrical current flow, the elongate member can be positioned to any of a plurality of positions. When electrical current flow is present, the elongate member becomes rigid and, thus, resistive to movement.

12 Claims, 3 Drawing Sheets

ELECTRONIC DEVICE SUPPORT CONTAINING RHEOLOGICAL MATERIAL WITH CONTROLLABLE VISCOSITY

FIELD OF THE INVENTION

The present invention relates generally to electronic devices and, more particularly, to devices that support electronic devices for hands-free operation thereof.

BACKGROUND OF THE INVENTION

Portable telecommunications devices, such as radiotelephones (e.g., cellular telephones), have become increasingly popular for both personal and commercial use. Usage of portable telecommunications devices, such as radiotelephones, within vehicles has also increased in popularity. Radiotelephones are frequently placed in a holder, often referred to as a cradle, when used in a vehicle. These cradles can allow a radiotelephone to be connected to various peripheral devices such as speakerphones, vehicle power supplies, externally mounted antennas, and auxiliary transmitters.

Various peripheral devices have recently become available for use with radiotelephones to facilitate hands-free operation within a vehicle. For example, remotely located radiotelephone speakers that can be adjustably positioned in proximity to a driver of a vehicle are now available. These remotely located speakers are typically designed to be plugged into a cigarette lighter outlet of a vehicle. Unfortunately, because of the location of most cigarette lighter outlets, these remotely located speakers may be inconveniently located with respect to ashtrays, gearshifts, cup holders, and the like. Furthermore, these remotely located speakers may interfere with vehicle operation.

In order to reduce user inconvenience and vehicle operation interference, flexible "gooseneck" supports have been developed to allow users to position remotely located speakers to selected positions. Stiff, low-gauge wires are typically incorporated into these gooseneck supports to add rigidity to the support and to help hold a speaker in a user-selected position. Unfortunately, these gooseneck supports can be rather easily dislodged from a user-selected position when bumped, such as by a user's arm or leg.

SUMMARY OF THE INVENTION

In view of the above, it is an object of the present invention to enhance hands-free operation of electronic devices, such as radiotelephones, by vehicle operators.

It is another object of the present invention to provide flexible gooseneck supports for remotely located radiotelephone speakers that are controllably resistant to movement from a user selected position.

These and other objects of the present invention can be provided by a flexible support for an electronic device, such as a radiotelephone speaker, that contains Theological material that stiffens in the presence of an energy field such that the support becomes rigid and resistant to movement caused by external forces. According to an embodiment of the present invention, the support includes an elongate member having opposite first and second ends and an internal passageway extending between the first and second ends. The first end is configured to be inserted within, and to electrically communicate with, a cigarette lighter outlet of a vehicle. The second end is configured to support a speaker (or other electronic device). One or more electrical conductors extend through the internal passageway and are configured to provide electrical current to the speaker from the cigarette lighter outlet when the elongate member first end is in electrical communication with the cigarette lighter outlet.

A rheological material, preferably a magnetorhe-ological fluid, is disposed within the internal passageway and has a controllable viscosity that increases in response to the magnetic field that is created by electrical current flow through one or more of the electrical conductors, such that the elongate member is flexible in the absence of electrical current flow through the electrical conductor, and such that the elongate member is rigid in the presence of electrical current flow through the electrical conductor. As is known to those of skill in the art, rheological material can act as a free flowing fluid in the absence of magnetic or electric fields and can act substantially as a solid in the presence of a magnetic or electric field.

Accordingly, in the absence of electrical current flow through one or more of the electrical conductors, the elongate member is flexible so that a user can position the radiotelephone speaker to any of a plurality of positions. When the user plugs the first end of the elongate member into a cigarette lighter outlet (or otherwise induces electrical current flow through one or more of the electrical conductors), the rheological material viscosity increases (i.e., stiffens) causing the elongate member to become rigid and, thus, resistive to movement.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout the description of the figures.

Figure 1:
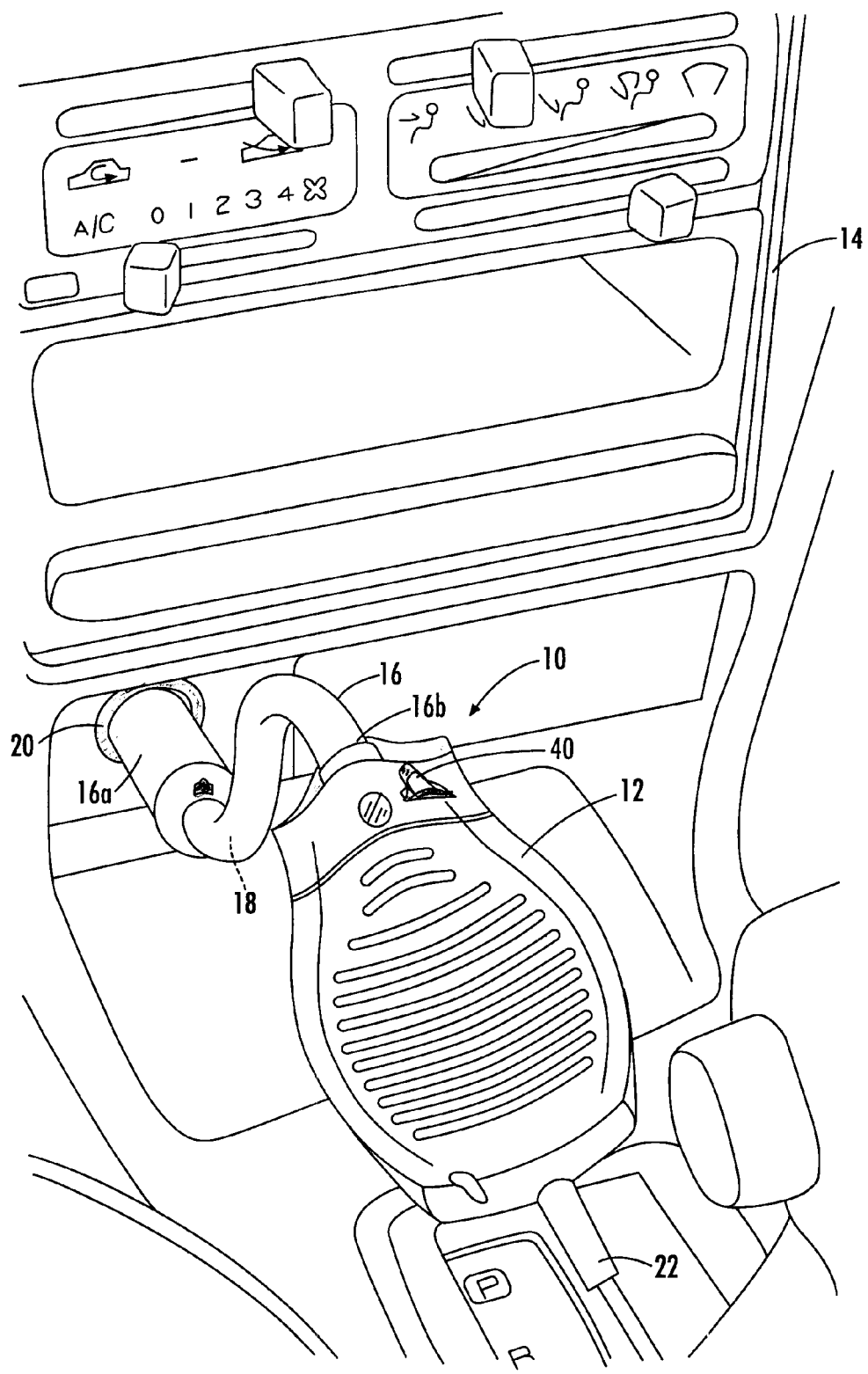
FIG. 1 is a perspective view of a support for a radiotelephone speaker according to an embodiment of the present invention wherein the support has an end that is plugged into a cigarette lighter outlet of a vehicle.
Figure 2:
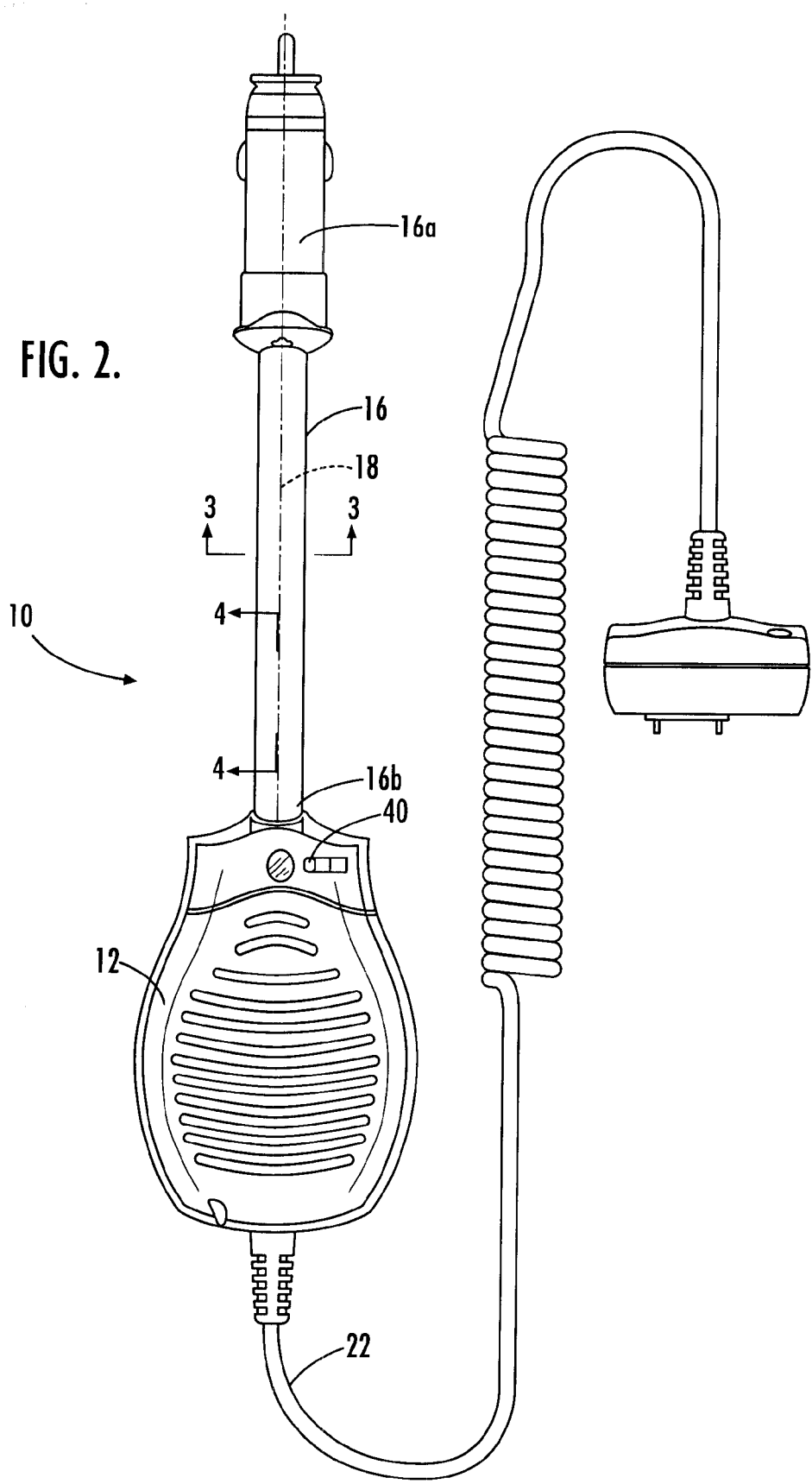
FIG. 2 is a plan view of the radiotelephone speaker support of FIG. 1.

Referring now to FIGS. 1 and 2 an apparatus 10 for use in a vehicle for supporting a radiotelephone speaker 12 in proximity to a driver of the vehicle 14 for hands-free operation is illustrated. The illustrated apparatus 10 includes an elongate member 16 having opposite first and second ends 16a, 16b and an internal passageway 18 extending between the first and second ends 16a, 16b. The elongate member 16 may be formed from various materials including, but not limited to, rubber, plastic and metal.

In the illustrated embodiment, the elongate member first end 16a is a plug that is configured to be inserted within, and electrically communicate with, a cigarette lighter outlet 20 of the vehicle 14. Plugs for insertion within vehicle cigarette lighter outlets are well known in the art and need not be described further herein. The elongate member second end 16b is attached to, and supports, the speaker 12 (or other electronic device) as illustrated.

The elongate member 16 is flexible to permit a user to position the speaker 12 in any of a plurality of positions to facilitate hands-free operation without interfering with vehicle operations. As will be described below, the elongate member internal passageway 18 contains a rheological material that stiffens in the presence of an electromagnetic field such that the elongate member becomes substantially rigid in a user-selected position. As illustrated in FIG. 2, a cable 22 is configured to electrically connect the speaker 12 with a radiotelephone (not shown) located within the vehicle 14.

Figure 3:
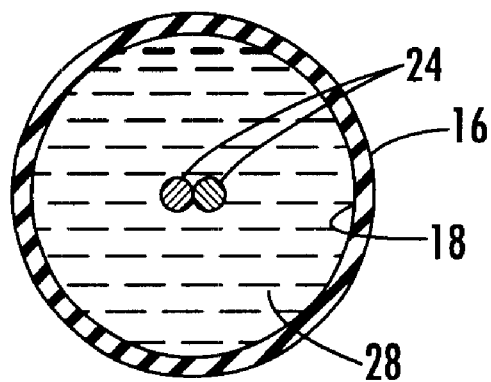
FIG. 3 is a cross-sectional view of the radiotelephone speaker support of FIG. 2 taken along lines 3—3 and illustrating the rheological material surrounding the one or more electrical conductors.

Referring now to FIG. 3, one or more electrical conductors 24 extend through the internal passageway 18 of the elongate member 16. One or more of the electrical conductors are configured to provide electrical current from the cigarette lighter outlet 20 to the speaker 12 and radiotelephone when the elongate member first end (16a, FIGS. 1–2) is plugged into the cigarette lighter outlet (20, FIGS. 1–2).

A rheological material 28 having a controllable viscosity is disposed within the internal passageway 18, as illustrated. The viscosity of the rheological material 28 increases (i.e., the rheological material 28 stiffens) in response to the magnetic field created by electrical current flow through one or more of the electrical conductors 24. The elongate member (16, FIGS. 1–2) is flexible in the absence of electrical current flow through one or more of the electrical conductors 24. Conversely, the elongate member (16, FIGS. 1–2) becomes rigid in the presence of electrical current flow through one or more of the electrical conductors 24.

The term "rheological material", as used herein refers to both magneto-rheological materials and electro-rheological materials. As known to those of skill in the art, a rheological material exhibits a significant change in its ability to flow or shear upon the application of an appropriate energy field.

According to a preferred embodiment of the present invention, the rheological material 28 is a magneto-rheological fluid, which is responsive to the presence of a magnetic field for changing its ability to flow or shear. Magneto-rheological fluids are typically suspensions of micron sized magnetizable particles in a liquid such as oil. In the absence of a magnetic field, a magneto-rheological fluid is a free-flowing liquid with a consistency similar to motor oil. When exposed to a magnetic field, the magnetizable particles align and reduce the ability of the magneto-rheological fluid to flow. The shear resistance of the magneto-rheological fluid is a function of the magnitude of the applied magnetic field.

Magneto-rheological fluids are generally known as disclosed in U.S. Pat. Nos. 5,257,681; 5,284,330; 5,277,281; 5,167,850; 4,992,190, the disclosures of which are incorporated by reference as if recited in full herein. Electro-rheological fluids are also generally known as disclosed in U.S. Pat. Nos. 4,923,057; 5,087,382; 5,075,023; and 5,139,691, the disclosures of which are incorporated by reference as if recited in full herein. A suitable magneto-rheological material may be available from Lord Corporation in Cary, North Carolina under the name of RHEONETIC™ magnetic fluids. However, other rheological fluids can also be used in accordance with this invention. For example, electro-rheological fluids, which are responsive to the presence of an electrical field (such as voltage) may also be used. According to another embodiment of the present invention, the rheological material 28 may include foam impregnated with a rheological fluid.

Figure 4:
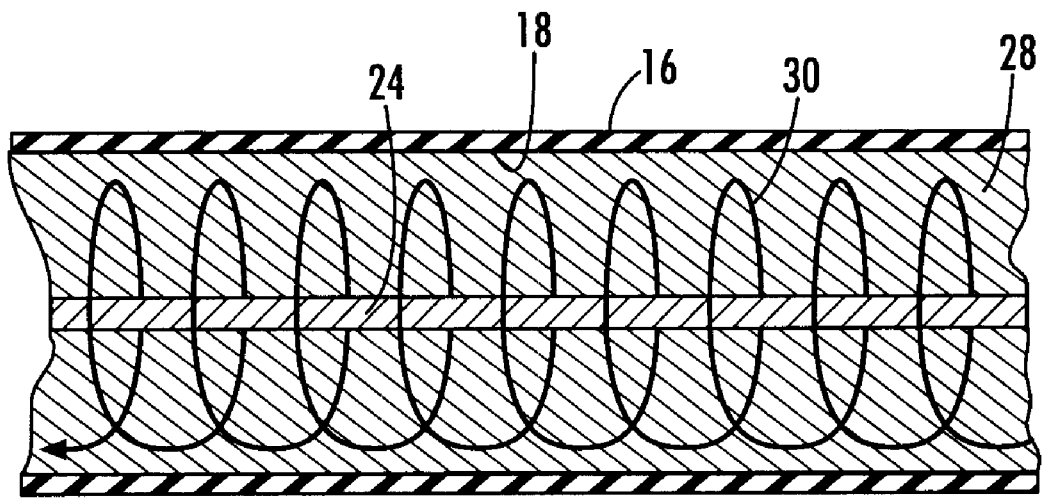
FIG. 4 is a cross-sectional view of the radiotelephone speaker support of FIG. 2 taken along lines 4—4 and illustrating a magnetic field generated by the flow of electrical current through the one or more electrical conductors.

Referring to FIG. 4, a cross-sectional view of the elongate member 16 is illustrated. Electrical current is flowing through the illustrated electrical conductor 24 and a resulting magnetic field generated thereby is illustrated and designated as 30. The generated magnetic field 30 causes the rheological material 28 to stiffen as described above so that the elongate member 16 becomes rigid.

Preferably, the rheological material 28 is disposed within the internal passageway 18 so as to surround one or more of the electrical conductors 24. However, one or more electrical conductors, or other magnetic field sources, may be positioned adjacent the rheological material 28, as would be understood by one of skill in the art.

It is understood that the present invention is not limited to the illustrated embodiments. For example, an elongate member 16 according to the present invention may be mounted directly to a vehicle dashboard, or other vehicle portion, and may be configured to receive electrical power from sources other than a cigarette lighter outlet. In addition, a switch 40 that controls electrical current flow through one or more of the electrical conductors 24 may be utilized to enhance operation of an apparatus according to the present invention.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An apparatus that supports an electronic device in proximity to a user for hands-free operation, comprising:
   an elongate member having opposite first and second ends and an internal passageway extending between the first and second ends, wherein the first end is configured to electrically communicate with an electrical power source, and wherein the second end is configured to support the electronic device;
   an electrical conductor extending through the internal passageway, wherein the electrical conductor is configured to provide electrical current to the electronic device from the electrical power source when the elongate member first end is in electrical communication with the electrical power source; and
   a Theological material disposed within the internal passageway, wherein the rheological material has a controllable viscosity that increases in response to a magnetic field generated by electrical current flow through the electrical conductor, such that the elongate member is flexible in the absence of electrical current flow through the electrical conductor, and such that the elongate member is rigid in the presence of electrical current flow through the electrical conductor.

2. An apparatus according to claim 1 wherein the electronic device is a speaker in electrical communication with a radiotelephone transceiver.

3. An apparatus according to claim 1 wherein the rheological material comprises a rheological fluid.

4. An apparatus according to claim 1 wherein the rheological material comprises a magneto-rheological fluid.

5. An apparatus according to claim 1 wherein the rheological material comprises foam impregnated with rheological material.

6. An apparatus according to claim 1 wherein the electrical power source is a cigarette lighter outlet within a vehicle and wherein the elongate member first end is configured to be inserted into the cigarette lighter outlet and to receive electrical current from the cigarette lighter outlet.

7. An apparatus according to claim 1 further comprising a switch that controls electrical current flow through the electrical conductor.

8. An apparatus for use in a vehicle for supporting a radiotelephone speaker in proximity to a driver of the vehicle for hands-free operation, the apparatus comprising:

an elongate member having opposite first and second ends and an internal passageway extending between the first and second ends, wherein the first end is configured to be inserted within, and electrically communicate with, a cigarette lighter outlet of the vehicle, and wherein the second end is configured to support the radiotelephone speaker;

an electrical conductor extending through the internal passageway, wherein the electrical conductor is configured to provide electrical current to the radiotelephone and speaker from the cigarette lighter outlet when the elongate member first end is in electrical communication with the cigarette lighter outlet; and a rheological material disposed within the internal passageway, wherein the theological material has a controllable viscosity that increases in response to a magnetic field generated by electrical current flow through the electrical conductor, such that the elongate member is flexible in the absence of electrical current flow through the electrical conductor, and such that the elongate member is rigid in the presence of electrical current flow through the electrical conductor.

9. An apparatus according to claim 8 wherein the rheological material comprises a rheological fluid.

10. An apparatus according to claim 8 wherein the rheological material comprises a magneto-rheological fluid.

11. An apparatus according to claim 8 wherein the rheological material comprises foam impregnated with rheological material.

12. An apparatus according to claim 8 further comprising a switch that controls electrical current flow through the electrical conductor.

* * * * *

UNITED STATES PATENT AND TRADEMARK OFFICE
CERTIFICATE OF CORRECTION

PATENT NO. : 6,434,237 B1  
DATED : August 13, 2002  
INVENTOR(S) : Matthew Justin Murray It is certified that error appears in the above-identified patent and that said Letters Patent is hereby corrected as shown below:

<u>Column 6,</u>  
Line 8, should read -- ...passageway, wherein the rheological material has a... --

Signed and Sealed this

Twenty-fourth Day of December, 2002

JAMES E. ROGAN  
*Director of the United States Patent and Trademark Office*

UNITED STATES PATENT AND TRADEMARK OFFICE
CERTIFICATE OF CORRECTION

PATENT NO. : 6,434,237 B1
DATED : August 13, 2002
INVENTOR(S) : Matthew Justin Murray It is certified that error appears in the above-identified patent and that said Letters Patent is hereby corrected as shown below:

<u>Title page,</u>
Item [57], ABSTRACT,
Line 3, please change "Theological" to -- rheological --
Line 8, please change "theological" to -- rheological --

<u>Column 4,</u>
Line 61, please change "theological" to -- rheological --

<u>Column 6,</u>
Line 8, pleace change "theological" to -- rheological --

Signed and Sealed this

Fifteenth Day of April, 2003

JAMES E. ROGAN
*Director of the United States Patent and Trademark Office*